United States Patent
Kawai

(10) Patent No.: US 8,805,282 B2
(45) Date of Patent: Aug. 12, 2014

(54) RADIO TRANSMISSION SYSTEM AND INTERFERENCE COMPENSATION METHOD

(75) Inventor: Masahiro Kawai, Tokyo (JP)

(73) Assignee: NEC Corporation, Tokyo (JP)

( * ) Notice: Subject to any disclaimer, the term of this patent is extended or adjusted under 35 U.S.C. 154(b) by 475 days.

(21) Appl. No.: 12/527,019

(22) PCT Filed: Feb. 14, 2008

(86) PCT No.: PCT/JP2008/052911
§ 371 (c)(1),
(2), (4) Date: Aug. 13, 2009

(87) PCT Pub. No.: WO2008/099964
PCT Pub. Date: Aug. 21, 2008

(65) Prior Publication Data
US 2010/0015922 A1  Jan. 21, 2010

(30) Foreign Application Priority Data

Feb. 16, 2007 (JP) .................................. 2007-035640

(51) Int. Cl.
H04B 1/00 (2006.01)
H04B 15/00 (2006.01)
(52) U.S. Cl.
USPC ..................................................... 455/63.1
(58) Field of Classification Search
CPC .................. H04B 7/0413; H04L 2025/03426; H04L 25/03006
USPC ..................................................... 455/63.1
See application file for complete search history.

(56) References Cited

U.S. PATENT DOCUMENTS

| | | | | |
|---|---|---|---|---|
| 5,666,365 A | * | 9/1997 | Kostreski | 370/486 |
| 5,920,595 A | * | 7/1999 | Iwamatsu | 375/235 |
| 6,141,393 A | * | 10/2000 | Thomas et al. | 375/347 |
| 6,236,263 B1 | * | 5/2001 | Iwamatsu | 329/306 |
| 2002/0172261 A1 | * | 11/2002 | Hershey et al. | 375/130 |
| 2003/0128658 A1 | * | 7/2003 | Walton et al. | 370/208 |
| 2004/0014501 A1 | * | 1/2004 | Kuwahara et al. | 455/561 |
| 2004/0076124 A1 | * | 4/2004 | Agrawal et al. | 370/310 |
| 2005/0031063 A1 | * | 2/2005 | Laot et al. | 375/348 |
| 2005/0107057 A1 | * | 5/2005 | Sun | 455/272 |
| 2005/0122998 A1 | | 6/2005 | Kamerman et al. | |
| 2005/0135492 A1 | * | 6/2005 | Jia et al. | 375/260 |

(Continued)

FOREIGN PATENT DOCUMENTS

| EP | 1523112 A | 4/2005 |
|---|---|---|
| EP | 1542376 A | 6/2005 |

(Continued)

OTHER PUBLICATIONS

Supplementary European Search Report for EP 08 71 1700 issued Nov. 17, 2011.

(Continued)

Primary Examiner — Yuwen Pan
Assistant Examiner — Ayodeji Ayotunde
(74) Attorney, Agent, or Firm — Sughrue Mion, PLLC

(57) ABSTRACT

A radio transmission system includes a MIMO reception processing unit for performing reception-side MIMO processing to output a plurality of reception modulated signals respectively corresponding to a plurality of unique paths. The system further includes an interference compensation unit for compensating inter-path interference contained in the plurality of reception modulated signals.

10 Claims, 5 Drawing Sheets

(56) References Cited

U.S. PATENT DOCUMENTS

| | | | |
|---|---|---|---|
| 2006/0063491 A1* | 3/2006 | Sudo | 455/63.1 |
| 2006/0199596 A1* | 9/2006 | Teauge et al. | 455/458 |
| 2007/0279278 A1* | 12/2007 | Stewart | 342/159 |

FOREIGN PATENT DOCUMENTS

| | | |
|---|---|---|
| EP | 1569362 A | 8/2005 |
| JP | A-H09-51296 A | 2/1997 |
| JP | A-H11-17762 A | 1/1999 |
| JP | A-2003-258770 A | 9/2003 |
| WO | 03041300 A | 5/2003 |
| WO | 2005036776 A | 4/2005 |

OTHER PUBLICATIONS

International Search Report for PCT/JP2008/052911 mailed May 27, 2008.

P.F. Driessen, et al., "On the Capacity Formula for Multiple Input-Multiple Output Wireless Channels: A Geometric Interpretation", IEEE Transactions of Communications, vol. 47, No. 2, Feb. 1999, pp. 173-176.

Japanese Office Action for JP2008-558163 issued Oct. 19, 2011.

Y. Ogawa et al., "Performance of MIMO Spatial Multiplexing in Indoor Line-of-Sight Environments", 2005 IEEE 62nd Vehicular Technology Conference, VTC2005-Fall. Sep. 2005, pp. 2398-2402.

* cited by examiner

RADIO TRANSMISSION SYSTEM AND INTERFERENCE COMPENSATION METHOD

This application is the National Phase of PCT/JP2008/052911, filed Feb. 14, 2008, which is based upon and claims priority to Japanese Patent Application No. 2007-035640, filed Feb. 16, 2007, the disclosure of which is incorporated herein in its entirety by reference.

TECHNICAL FIELD

This invention relates to a radio transmission system and an interference compensation method having an interference compensation function for use on the reception side of a multiple input multiple output (MIMO) radio communication system.

BACKGROUND ART

MIMO technologies have gradually been applied in practical use to over-the-horizon communication to improve the communication capacity. On the other hand, it has been believed that such MIMO technologies are not suitable for line-of-sight communication. However, Non-Patent Document 1 given below describes that, even in line-of-sight communication, a plurality of orthogonal virtual paths can be generated by devising arrangement of transmission and reception antennas, and the communication capacity can be improved. According to this method, phase rotation of a carrier signal caused by difference in propagation delay is utilized effectively to cancel spurious waves so that independent data paths are formed. When the difference in propagation delay is increased according to spacing between antennas to a significant value for a symbol cycle, inter-symbol interference or interference between unique paths will occur. While the inter-symbol interference can be equalized by a conventional equalizer, the inter-path interference will result in deterioration of communication quality unless appropriate countermeasures are taken.

Non-Patent Document 1: P. F. Driessen, G. J. Foschini; "On the Capacity Formula for Multiple Input-Multiple Output Wireless Channels: A Geometric Interpretation"; IEEE TRANSACTIONS ON COMMUNICATIONS, VOL. 47, No. 2, P. 173, February 1999

DISCLOSURE OF THE INVENTION

As described in Non-Patent Document 1 mentioned above, even in line-of-sight communication, a plurality of orthogonal transmission paths can be provided by appropriately setting the distance between a plurality of transmission antennas or between a plurality of reception antennas.

In a MIMO system, when received signals are processed to separate unique paths, signals received by the antennas are synthesized. If the transmission paths connecting between the transmission and reception antennas have different transmission distances and thus the difference in their propagation time is considerably large in comparison with the symbol cycle of modulated waves, inter-symbol interference or interference between unique paths will occur during MIMO processing on the reception side, possibly resulting in deterioration of transmission characteristics.

Inter-symbol interference caused by difference in transmission delay between antennas is equivalent to ordinary inter-symbol interference caused by phasing or the like, and thus can be compensated by a conventional signal equalizer. It is therefore an object of this invention to provide a radio transmission system and an interference compensation method which is able to remove the other one of the above-mentioned interferences, that is, the interference between unique paths.

In order to achieve the object above, this invention employs means for achieving the object having features as described below.

A radio transmission system according to one aspect of this invention is characterized by including a MIMO (Multiple Input Multiple Output) reception processing unit for performing reception-side MIMO processing to output a plurality of reception modulated signals respectively corresponding to a plurality of unique paths; and an interference compensation unit for compensating inter-path interference contained in the plurality of reception modulated signals.

An interference compensation method according to another aspect of this invention is characterized by including the steps of performing reception-side MIMO (Multiple Input Multiple Output) processing; and compensating inter-path interference contained in the plurality of reception modulated signals.

If the system can be set up in an ideal state by appropriately setting the frequency of electromagnetic waves to be used and the antenna arrangement, communication paths can be ensured without performing adaptive MIMO processing. However, when a frequency is selected and antennas are arranged in a practical use, it is not possible to realize a completely ideal state due to various constraints. According to this invention, inter-path interference possibly occurring when there is deviation from the ideal state can be removed, whereby advantageous effects can be obtained that the conditions for antenna arrangement are alleviated and high-quality communication paths are ensured.

BEST MODE FOR CARRYING OUT THE INVENTION

Figure 1:
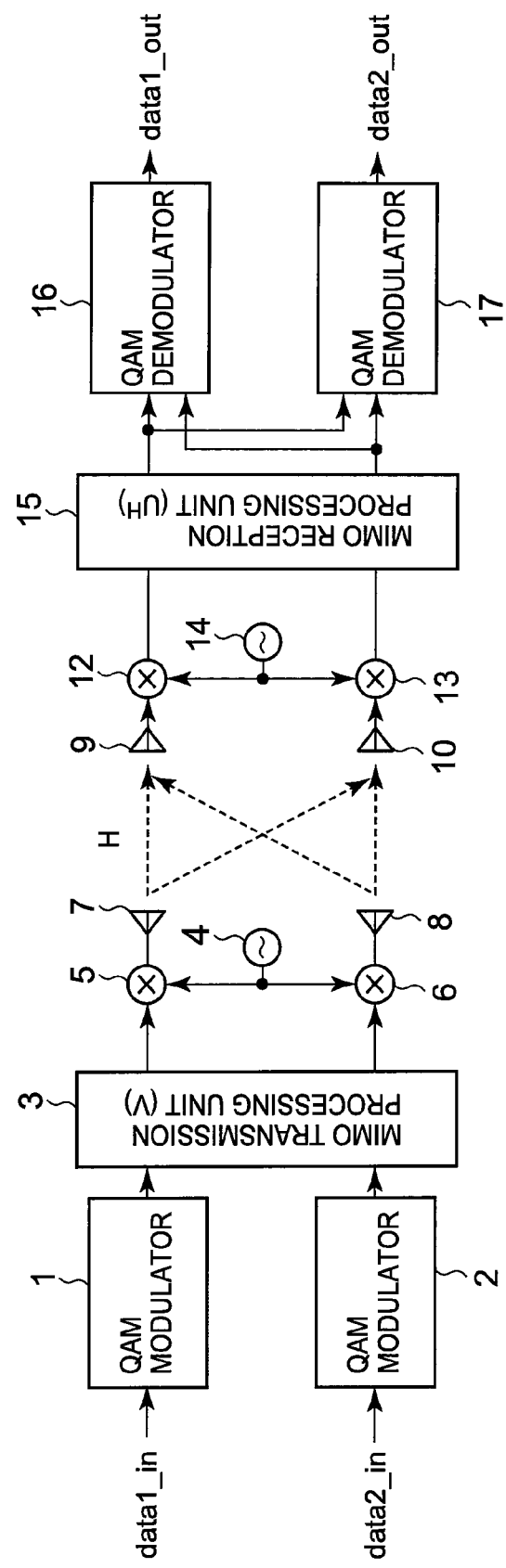
FIG. 1 is a diagram showing a configuration of a radio transmission system according to an embodiment of this invention.
Figure 2:
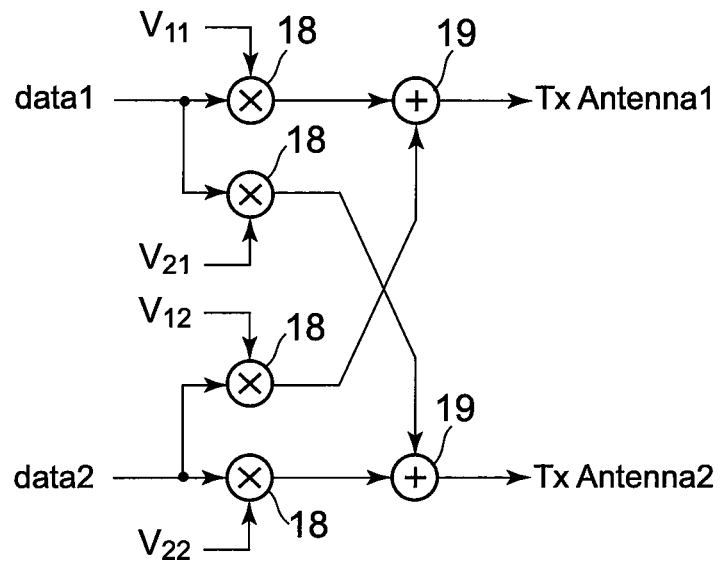
FIG. 2 is a diagram showing a configuration of a MIMO transmission processing unit.

Detailed description will be made of an embodiment of this invention with reference to the drawings. FIG. 1 shows a configuration of a radio transmission system according to this embodiment. QAM modulators 1, 2 are modulators (modulation units) for converting input information into QAM modulated waves. While there are various modulation methods including QPSK and 16 QAM, advantages of this invention can be obtained by employing any of them. The QAM modulators 1, 2 are commonly-used single-carrier QAM modulators, and detailed description of the configuration thereof will be omitted. Modulated waves output from the QAM modulators 1, 2 are input to a multiple input multiple output transmission processing unit (hereafter, referred to in short as the MIMO transmission processing unit) 3. The MIMO transmission processing unit 3 and a multiple input multiple output reception processing unit (hereafter, referred to in sort as the MIMO reception processing unit) 15 are units for performing the MIMO processing employing SVD (Singular Value Decomposition). The inside of the MIMO transmission processing unit 3 is generally configured as shown in FIG. 2. While the detail will be described later, the MIMO transmission processing unit 3 is composed of a multiplier 18 and an adder 19, and performs matrix operation on an input signal and a matrix V. A signal output from the MIMO transmission processing unit 3 is converted into a RF (Radio Frequency) signal by mixers 5, 6 and a local oscillator 4, and emitted from transmission antennas 7, 8 to the space. This means that the mixers 5, 6, the local oscillator 4, and the transmission antennas 7, 8 function as radio transmission units.

Figure 3:
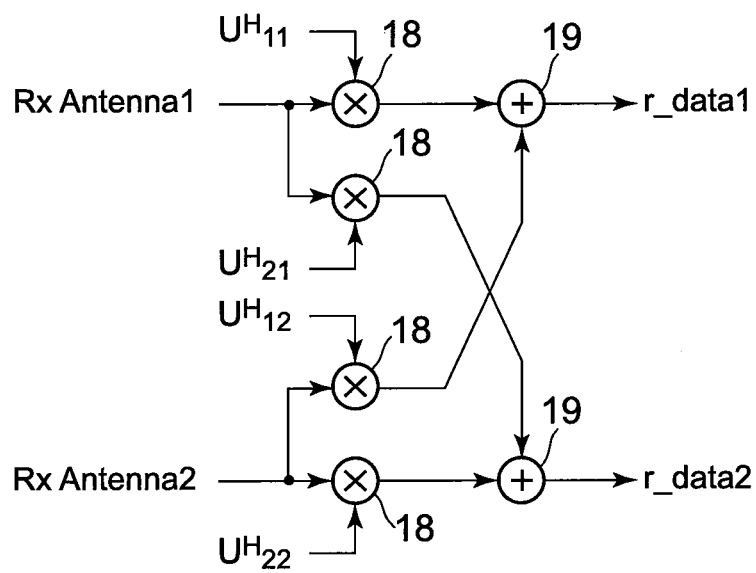
FIG. 3 is a diagram showing a configuration of a MIMO reception processing unit.

A signal received by a reception antenna 9, 10 is converted into an IF (Intermediate Frequency) signal by a mixers 12, 13 and a local oscillator 14. This means that the reception antenna 9, 19, the mixer 12, 13, and the local oscillator 14 function as a radio reception unit. The IF signal is input to the MIMO reception processing unit 15. The configuration of the MIMO reception processing unit 15 is generally as shown in FIG. 3, and particulars of its processing operation will be described later. Like the MIMO transmission processing unit 3, the MIMO reception processing unit 15 is composed of a multiplier 18 and an adder 19, and performs matrix operation on an input signal and a matrix $U^H$. The signals (reception modulated signals) output from the MIMO reception processing unit 15 are each bifurcated to be input to QAM demodulators 16, 17.

The MIMO reception processing unit 15 operates to separate unique paths Specifically, the MIMO reception processing unit 15 outputs reception modulated signals (r_data1, r_data2) respectively corresponding to a plurality of (two in this example) unique paths. The QAM demodulators 16, 17 are provided in association with the respective unique paths so that one of the two reception modulated signals input thereto is QAM modulated as the main signal. The other reception modulated signal is used for removing interference components contained in the main signal. Thus, the QAM demodulators 16, 17 regenerate and output the QAM modulated transmission data.

Figure 4:
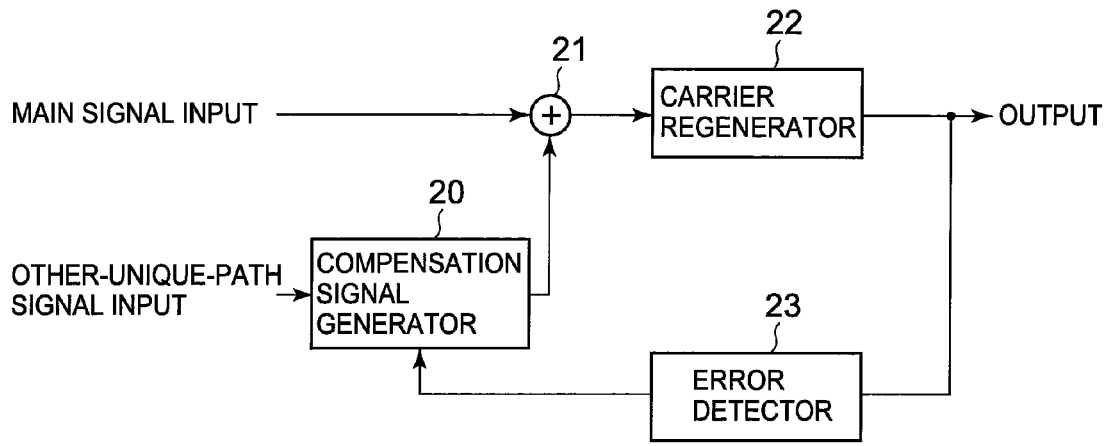
FIG. 4 is a diagram showing a configuration of a QAM demodulator.

FIG. 4 shows particulars of the QAM demodulators 16, 17. Here, detailed description will be made on a configuration of the QAM demodulator 16.

The QAM demodulator 16 includes a compensation signal generator 20, an adder 21, an error detector 23, and a carrier regenerator 22. The compensation signal generator 20, the adder 21, and the error detector 23 together form an interference compensation unit (inter-path interference compensator). The QAM demodulator 16 receives the reception modulated signal r_data1 from the MIMO reception processing unit 15 at its main signal input. The QAM demodulator 16 also receives a reception modulated signal r_data2 from the MIMO reception processing unit 15 at its other unique path signal input. If there is no interference, the reception modulated signal r_data1 is equivalent to a signal obtained by modulating data 1 (data1), and the reception modulated signal r_data2 is equivalent to a signal obtained by modulating data 2 (data2).

In the QAM demodulator 16, an input main signal is supplied to the adder 21. The adder 21 adds a compensation signal to be described later to the main signal, and outputs the addition result to the carrier regenerator 22. The carrier regenerator 22 QAM modulates the received signal. The demodulated signal from the carrier regenerator 22 is bifurcated so that one is output externally and the other is supplied to the error detector 23.

Receiving the demodulated signal, the error detector 23 detects an error with respect to an ideal position of the signal point of the demodulated signal, and outputs the detection result to the compensation signal generator 20.

The compensation signal generator 20 compares the error signal with the input other-unique-path signal to generate a compensation signal for compensating inter-path interference contained in the main signal.

The compensation signal generated by the compensation signal generator 20 is output to the adder 21, and added to the main signal input to the adder 21 as described above. The inter-path interference component contained in the main signal is removed in this manner.

The QAM demodulator 17 has the same configuration as that of the QAM demodulator 16. The QAM demodulator 17 receives, at its main signal input, a reception modulated signal r_data2 from the MIMO reception processing unit 15, and receives, at its other-unique-path signal input, a reception modulated signal r_data1 also from the MIMO reception processing unit 15.

Figure 5:
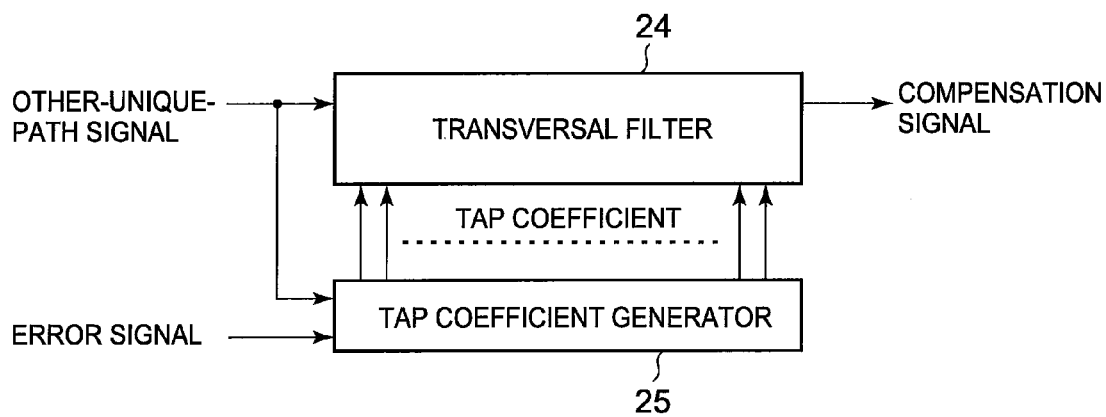
FIG. 5 is a diagram showing a configuration of a compensation signal generator.

As shown in FIG. 5, the compensation signal generator 20 is composed of a tap coefficient generation circuit 25 and a transversal filter 24. The tap coefficient generation circuit 25 computes the correlation between the other-unique-path signal and the error signal input from the error detector 23 to generate a tap coefficient for allowing the transversal filter 24 to generate a signal for cancelling the other-unique-path signal component contained in the main signal. The transversal filter 24 is a FIR (Finite Impulse Response) filter having the tap coefficient generated by the tap coefficient generation circuit 25. Receiving the other-unique-path signal, the transversal filter 24 generates a compensation signal for cancelling the other-unique-path signal component mixed in the main signal.

Description will be made on operation of the radio transmission system according to this embodiment. Utilization of the MIMO technology in line-of-sight communication will be described. Non-Patent Document 1 mentioned above indicates that, in line-of-sight communication as well, a plurality of mutually orthogonal communication paths can be formed, using the same frequency and the same polarized wave, by appropriately setting the transmission frequency, the station-to-station distance, and the spacing between the transmission and reception antennas. If such a system can be established, any variation in the optimal conditions due to change of weather condition or the like can be absorbed by means of adaptive processing using SVD, one of the methods for realizing conventional over-the-horizon MIMO systems.

Description will now be made on line-of-sight MIMO communication using SVD. When it is assumed that communication is performed using two transmission antennas and two reception antennas, space transfer characteristic H can be represented by a matrix of two rows and two columns. Specifically, the inputs $$\begin{bmatrix} x_{r1} \\ x_{r2} \end{bmatrix}$$

of the two reception antennas can be represented by the following formula (1) by using outputs $$\begin{bmatrix} x_{t1} \\ x_{t2} \end{bmatrix}$$

of the two transmission antennas.

$$\begin{bmatrix} x_{r1} \\ x_{r2} \end{bmatrix} = \begin{bmatrix} H_{11} & H_{12} \\ H_{21} & H_{22} \end{bmatrix} \begin{bmatrix} x_{t1} \\ x_{t2} \end{bmatrix} \quad (1)$$

In the formula above, the elements $H_{mn}$ of the matrix H represent transfer characteristics of the n-th transmission antenna to the m-th reception antenna. Each element is typically represented by a complex number, and represents a change in amplitude and a change in phase. When this matrix H is singular value decomposed, the following formula (2) is obtained.

$$H = UDV^H \Rightarrow \begin{bmatrix} H_{11} & H_{12} \\ H_{21} & H_{22} \end{bmatrix} = \begin{bmatrix} U_{11} & U_{12} \\ U_{21} & U_{22} \end{bmatrix} \begin{bmatrix} \sqrt{\lambda_1} & 0 \\ 0 & \sqrt{\lambda_2} \end{bmatrix} \begin{bmatrix} V_{11} & V_{12} \\ V_{21} & V_{22} \end{bmatrix}^H \quad (2)$$

In this formula (2), U and V are unitary matrices, satisfying $UU^H=U^HU=I$ and $VV^H=V^HV=I$. Here, H represents a Hermitian conjugate, and I represents a unit matrix.

When it is assumed that the vector of a transmission signal is $$T = \begin{bmatrix} t_1 \\ t_2 \end{bmatrix}$$

and the vector of a received signal is $$R = \begin{bmatrix} r_1 \\ r_2 \end{bmatrix},$$

two virtual transmission paths orthogonal to each other can be obtained when V acts on the transmission signal T and $U^H$ acts on the received signal. This is represented as the formula (3) below.

$$R = U^H HVT = U^H(UDV^H)VT = (U^HU)D(V^HV)T = \quad (3)$$

$$DT \Rightarrow \begin{bmatrix} r_1 \\ r_2 \end{bmatrix} \begin{bmatrix} \sqrt{\lambda_1} & 0 \\ 0 & \sqrt{\lambda_2} \end{bmatrix} \begin{bmatrix} t_1 \\ t_2 \end{bmatrix} = \begin{bmatrix} \sqrt{\lambda_1} \ t_1 \\ \sqrt{\lambda_2} \ t_2 \end{bmatrix}$$

Accordingly, a plurality of virtual paths (referred to as the unique paths) are formed, having gains related to characteristics values $\lambda_1, \lambda_2$.

In line-of-sight communication, in general, $H_{11} \approx H_{21}$ or $H_{12} \approx H_{22}$, which means that the transmission points look the same from both of the reception antennas. Therefore, it is difficult to separate the plurality of paths. Specifically, as a result of the singular value decomposition, the singular value D assumes a large value at one of $\lambda$s, while assuming an almost zero value at the other $\lambda$s, and thus only one unique path can be formed.

It is also possible, however, to form a plurality of unique paths by utilizing electromagnetic waves of a microwave or millimeter wave band such that the spacing between the transmission antennas or the spacing between the reception antennas is set to a sufficiently great value relative to the wavelength of the electromagnetic waves. In other words, the elements of transfer function H between the transmission and reception antennas become mutually different, if the mutual difference among various paths for electromagnetic waves connecting between the transmission and reception antennas is significantly great relative to the wavelength of the electromagnetic waves to be used. If singular value decomposition is performed on such a transfer function H, a plurality of orthogonal unique paths can be formed.

Figure 6:
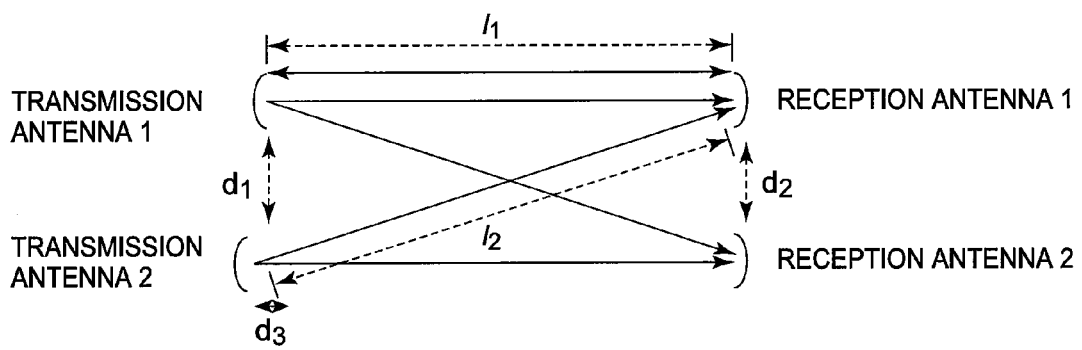
FIG. 6 is a diagram for explaining definition of antenna spacing.

For example, an antenna arrangement as shown in FIG. 6 can be envisaged. A transmission antenna 1 and a transmission antenna 2 are arranged at a distance $d_1$ from each other, while a reception antenna 1 and a reception antenna 2 are arranged at a distance $d_2$ from each other. It is defined that the transmission antenna 2 is displaced relative to the transmission antenna 1 in a longitudinal direction (transverse direction as viewed in the figure) by a distance $d_3$. When the distance between the transmission antenna 1 and the reception antenna 1 is represented by $l_1$, the distance between the transmission antenna 2 and the reception antenna 1 is represented by $l_2$, and it is assumed that $d_3$ is zero, the distance $l_2$ can be represented as $l_2=\sqrt{l_1^2+d_1^2}$, using and $l_1$ and $d_1$. If the difference between $l_1$ and $l_2$ is computed on the condition that $d_1 \ll l_1, l_2$, the difference can be represented by the following formula (4).

$$l_2 - l_1 \approx \frac{d_1^2}{2l_1} \quad (4)$$

If it is assumed that $d_1=5$ m, and $l_1$ is 5 km, for example, the path difference between the $l_1$ and $l_2$ is 2.5 mm. When the frequency of the electromagnetic waves is assumed to be 30 GHz, the wavelength $\lambda$ thereof will be 10 mm, and the path difference will be about $\lambda/4$. Under these conditions, the phase shift between carrier signals is 90 degrees. This corresponds to the conditions indicated by Non-Patent Document 1 mentioned above as the conditions under which the MIMO technology can be applied to line-of-sight communication.

Even if the antenna position is deviated from the conditions described above (e.g. if $d_3$ is made greater than zero), the adaptive processing using SVD can be performed to absorb any effects caused by this deviation. Here, the case is considered in which the transmission antenna 2 is shifted forward (to the left side as viewed in the figure) by a distance $d_3$. In this case, the path difference $(l_2-l_1)$ is approximated by further adding $d_3$ to the path difference obtained above. Specifically, the path difference $(l_2-l_1)$ is represented by the following formula (5).

$$l_2 - l_1 \approx \frac{d_1^2}{2l_1} + d_3 \quad (5)$$

In this case as well, a plurality of orthogonal transmission paths can be formed by performing adaptive processing using the SVD.

Here, the difference is considered between the propagation delay from the transmission antenna 1 to the reception antenna 2 and the propagation delay from the transmission antenna 2 to the reception antenna 1. For example, when the antenna arrangement error $d_3$ is 5 m, the difference in propagation delay is about 15 nsec. When the symbol rate of modulated waves is 25 Mbaud, the symbol cycle is 40 nsec, and hence the difference in propagation delay is significantly great relative to this symbol cycle. When the MIMO reception processing unit 15 performs synthesis of signals under such conditions, temporal deviation will occur between signals to be synthesized. As a first result, inter-symbol interference will occur due to its own signal, and as a second result, interference will occur from a signal from another unique path which is originally orthogonal.

Figure 7:
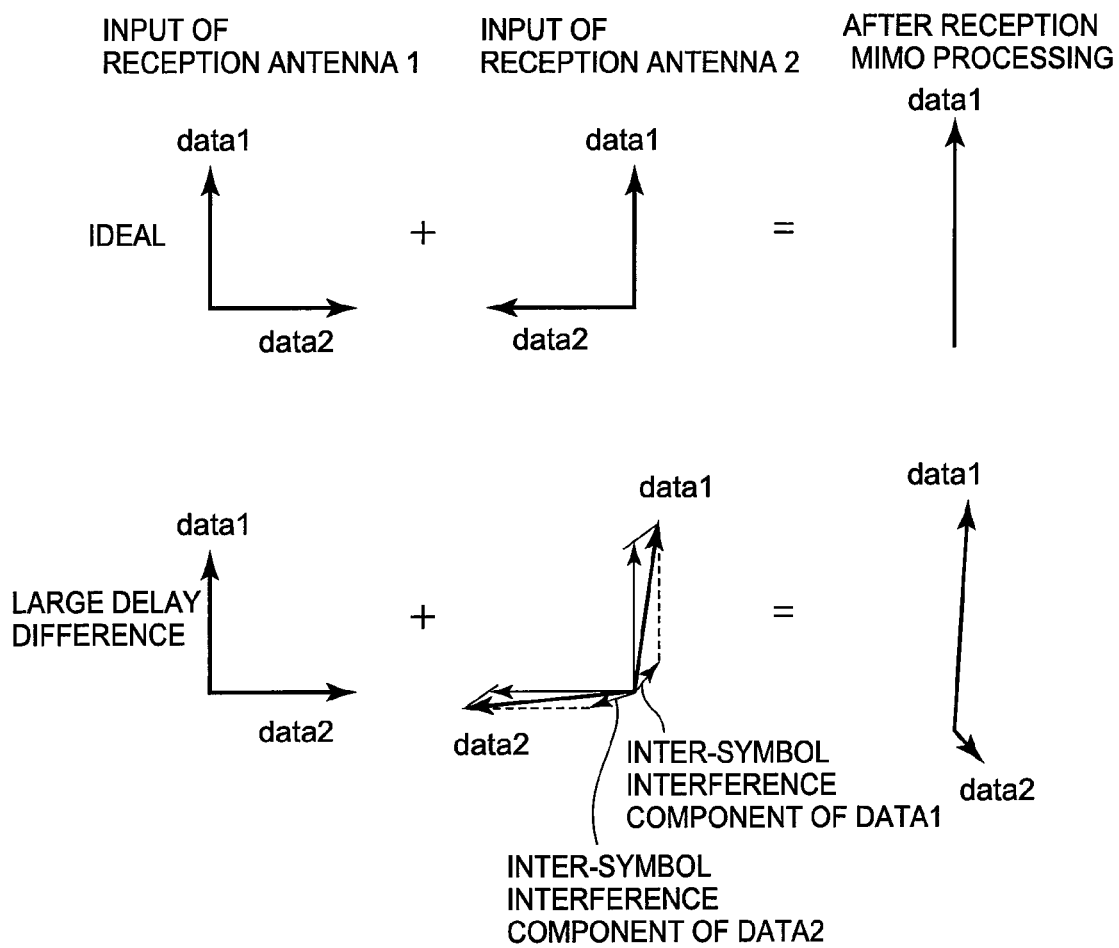
FIG. 7 is a diagram illustrating generation of inter-path interference by way of images.

FIG. 7 schematically illustrates this. FIG. 7 shows how signals are input to the reception antennas and how data 1 is separated by the reception MIMO processing. Under the ideal conditions (shown in the upper part of FIG. 7), the component of data 2 is canceled while the component of the data 1 is maintained after the MIMO processing. In contrast, in the example shown in the lower part of the FIG. 7 in which there exits an antenna arrangement error, signals are input to the reception antenna 2 in the state in which the components of the data 1 and data 2 at a certain instant of time are subjected to interference from symbol information at or around that instant of time (inter-symbol interference). If the MIMO processing is performed in this state, the signal of the data 1 is output with the signal of the data 2 mixed therein.

The inter-symbol interference establishing the first cause of interference is an interference between own symbols and does not pose a significant problem since it can be compensated with the use of a waveform equalizer which is conventionally used for preventing fading or the like. However, the second interference (i.e. inter-path interference), which seems as a noise having no correlation to the main signal, cannot be compensated with a waveform equalizer. According to this embodiment, the second interference can be removed by newly providing an inter-path interference compensator (interference compensation unit) for compensating the inter-path interference.

Operation for compensating the inter-path interference will be described below. The error detector 23 detects a deviation of the demodulated signal from the ideal signal point and outputs an error signal indicating the phase direction and the amplitude thereof. Since the error signal conveys information of the other-unique-path signal contained in the main signal, the phase, amplitude, and time of the other-unique-path signal contained in the main signal can be found by computing the correlation between the error signal and the other-unique-path signal. This computation is performed by the compensation signal generator 20.

In the inside of the compensation signal generator 20, a tap coefficient generator 25 computes a correlation between the error signal and the other-unique-path signal input to the compensation signal generator 20 to determine the interference phase, amplitude and time of the other-unique-path signal contained in the main signal. The tap coefficient generator 25 then generates a tap coefficient for canceling the interference with the use of a transversal filter 24. The transversal filter 24 receiving an other-unique-path signal uses the tap coefficient generated by the tap coefficient generation circuit 25 to generate and output a compensation signal for canceling interference components contained in the main signal. The compensation signal is a signal according to the interference phase, amplitude and time of the other-unique-path signal contained in the main signal. The adder 21 adds this compensation signal to the main signal to thereby compensate the inter-path interference.

Figure 8:
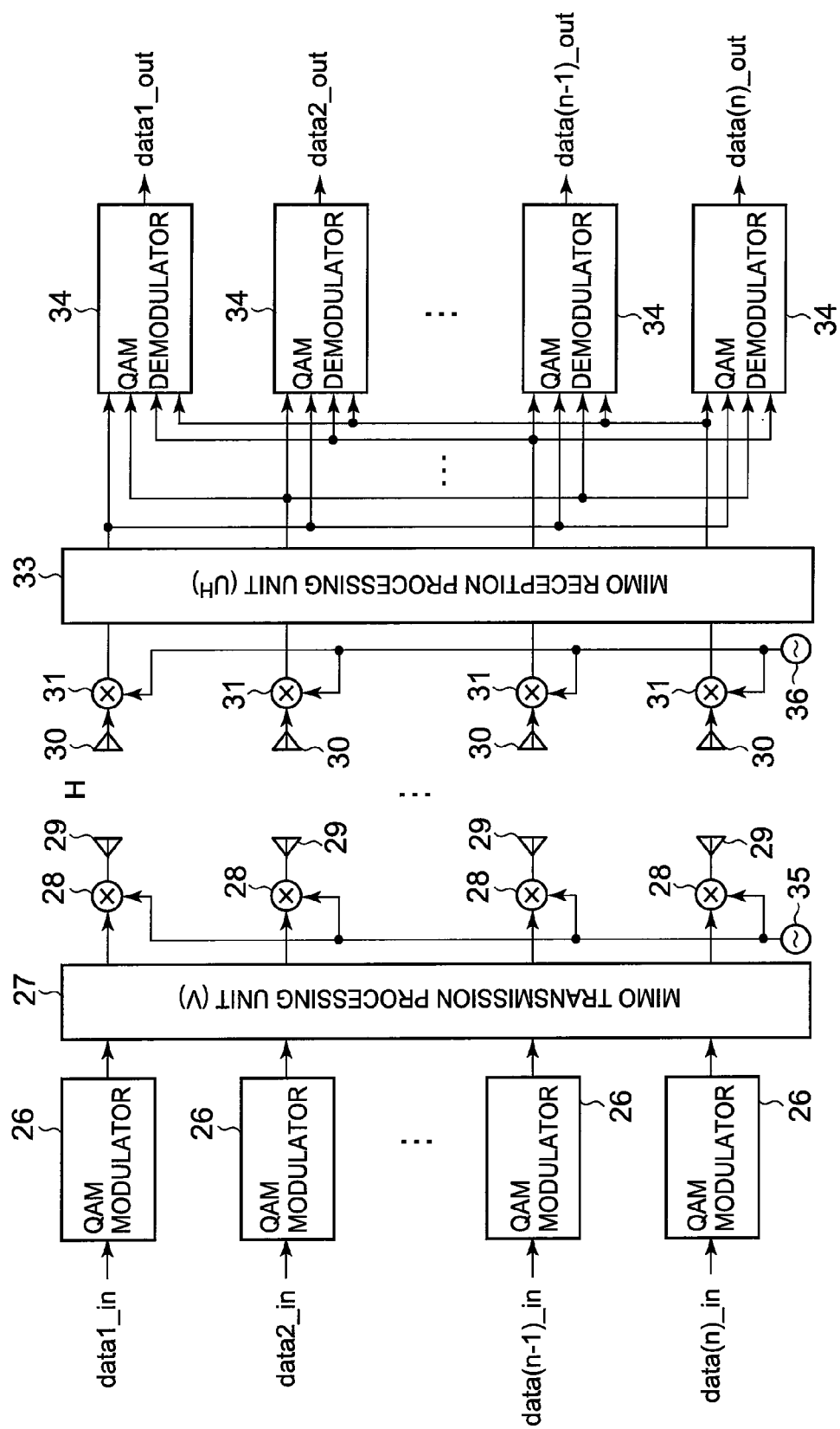
FIG. 8 is a diagram showing a configuration of a radio transmission system according to another embodiment of this invention.

Although the embodiment described above relates to a system example in which two transmission antennas and two reception antennas are used, the number of antennas is not limited to any specific value. As shown in FIG. 8, this invention is also applicable to a case in which three or more transmission antennas and three or more reception antennas are used. In this case, each of QAM demodulators 34 is provided with compensation signal generators corresponding to a number obtained by subtracting one from the total number of the reception antennas. Specifically, when the number of reception modulated signals is N (an integer of 2 or more), N QAM demodulators are provided in association with the N reception modulated signals. Each of the QAM demodulators has an interference compensation unit, and each interference compensation unit has (N−1) compensation signal generators. These compensation signal generators generate compensation signals for compensating interference from different other unique paths. The adder adds the compensation signal from the compensation signal generator to the main signal to compensate the inter-path interference.

Another embodiment will be described.

A radio transmission system according to another embodiment of this invention has a MIMO reception processing unit for performing reception-side MIMO processing to output a plurality of reception modulated signals respectively corresponding to a plurality of unique paths, and an interference compensation unit for compensating inter-path interference contained in the plurality of reception modulated signals.

This radio transmission system may have a carrier regenerator which is provided in correspondence with each of a plurality of reception modulated signals for modulating an input modulated signal and outputting a demodulated signal. In this case, the interference compensation unit may have an error detector which, upon receiving the demodulated signal, detects a deviation of the demodulated signal from the ideal signal point and generates an error signal representing the phase direction and amplitude thereof, a compensation signal generator which generates a compensation signal for compensating the inter-path interference contained in the corresponding reception modulated signal with the use of the error signal, and an adder which adds the compensation signal to the corresponding reception modulated signal to output the addition result as an input modulated signal to the carrier regenerator.

The compensation signal generator may be designed such that the compensation signal generator compares the error signal with another reception modulated signal corresponding to another unique path, generates a signal according to the phase, amplitude, and time of inter-path interference contained in the corresponding reception modulated signal, and outputs the generated signal as a compensation signal to the adder.

Further, the compensation signal generator may have a tap coefficient generator which computes a correlation between the other reception modulated signal and the error signal to generate a tap coefficient for cancelling the inter-path interference contained in the corresponding reception modulated signal, and a transversal filter for generating, with the use of the tap coefficient, a compensation signal for cancelling the inter-path interference contained in the corresponding reception modulated signal.

The radio transmission system described above may further have a MIMO transmission processing unit for performing transmission-side MIMO processing on a modulated transmission signal, a radio transmission unit for radio transmitting the signal obtained by the transmission-side MIMO processing, and a radio reception unit for receiving the radio signal transmitted by the radio transmission unit and transmitting a signal to be subjected to the reception MIMO processing to the MIMO reception processing unit.

The radio transmission system described above may be further provided with a modulation unit for modulating an input signal to generate a transmission signal and outputting the transmission signal to the MIMO transmission processing unit.

Still further, the radio transmission system described above may be further provided with a plurality of transmission antennas for transmitting radio signals and a plurality of reception antennas for receiving the radio signals.

A radio transmission method according to still another embodiment of this invention has a step of performing reception-side MIMO processing to output a plurality of reception modulated signals respectively corresponding to a plurality of unique paths, and a step of compensating inter-path interference contained in the plurality of reception modulated signals.

Here, the interference compensation step may have a step of receiving a demodulated signal from each of carrier regenerators provided in association with a plurality of reception modulated signals for demodulating the input modulated signal and outputting the demodulated signal, a step of detecting a deviation of the demodulated signal from the ideal signal point to generate an error signal representing the phase direction and amplitude of the deviation, a step of generating, using the error signal, a compensation signal for compensating inter-path interference contained in the corresponding reception modulated signal, and a step of adding the compensation signal to the corresponding reception modulated signal to output the addition result to the carrier regenerator as an input modulated signal.

The compensation signal generating step may have a step of comparing the error signal with another reception modulated signal corresponding to another unique path, and generating a signal according to the phase, amplitude, and time of inter-path interference contained in the corresponding reception modulated signal, as a compensation signal.

Further, the compensation signal generating step may have a step of computing correlation between the another reception modulated signal and the error signal to generate a tap coefficient for cancelling the inter-path interference contained in the corresponding reception modulated signal, and a step of generating, using the tap coefficient, a compensation signal for cancelling the inter-path interference contained in the corresponding reception modulated signal by means of the transversal filter.

Although this invention has been described in its preferred embodiments, it should be understood that these embodiments are only illustrative of an example of preferred embodiments of this invention, and this invention may be otherwise variously embodied without departing from the spirit and scope of the invention.

INDUSTRIAL APPLICABILITY

This invention is applicable to microwave or millimeter wave band fixed radio communication.

What is claimed is:

1. A radio transmission system in which a MIMO technology is applied to line-of-sight communication, the system comprising:
    a MIMO (Multiple Input Multiple Output) reception processing unit that performs reception-side MIMO processing to output a plurality of reception modulated signals respectively corresponding to a plurality of unique paths;
    an interference compensation unit that receives corresponding one of the reception modulated signals from the MIMO reception processing unit to cancel inter-path interference contained therein and caused as interference between the unique paths by difference in propagation delay according to antenna-to-antenna distances; and
    a carrier regenerator provided in association with each of the plurality of reception modulated signals for demodulating an input modulated signal and outputting the demodulated signal,
    wherein the interference compensation unit comprises:
    an error detector which, upon receiving the demodulated signal, detects a deviation of the demodulated signal from an ideal signal point and generates an error signal representing the phase direction and amplitude of the deviation;
    a compensation signal generator which generates a compensation signal for cancelling the inter-path interference contained in the corresponding reception modulated signal with the use of the error signal; and
    an adder which adds the compensation signal to the corresponding reception modulated signal and outputs the addition result to the carrier regenerator as the input modulated signal.

2. The radio transmission system as claimed in claim 1, wherein the compensation signal generator compares the error signal with another reception modulated signal corresponding to the other unique path, generates a signal according to the phase, amplitude, and time of the inter-path interference contained in the corresponding reception modulated signal, and outputs this signal to the adder as the compensation signal.

3. The radio transmission system as claimed in claim 2, wherein the compensation signal generator comprises:
    a tap coefficient generator for computing a correlation between the another reception modulated signal and the error signal to generate a tap coefficient for cancelling the inter-path interference contained in the corresponding reception modulated signal; and
    a transversal filter for generating and outputting the compensation signal for cancelling the inter-path interference contained in the corresponding reception modulated signal with the use of the tap coefficient.

4. The radio transmission system as claimed in claim 2, wherein when the number of the plurality of reception modulated signals is N (an integer of 2 or more), the radio transmission system comprises N interference compensation units respectively corresponding to the plurality of reception modulated signals, and each of the N interference compensation tion units has (N−1) compensation signal generators.

5. The radio transmission system as claimed in claim 1, further comprising:
    a MIMO transmission processing unit for performing transmission-side MIMO processing on a modulated transmission signal;
    a radio transmission unit for wirelessly transmitting the signal subjected to the transmission-side MIMO processing; and
    a radio reception unit for receiving the radio signal transmitted by the radio transmission unit and transmitting a signal to be subjected to reception-side MIMO processing to the MIMO reception processing unit.

6. The radio transmission system as claimed in claim 5, further comprising a modulation unit for modulating an input signal to generate the transmission signal and outputting the generated transmission signal to the MIMO transmission processing unit.

7. The radio transmission system as claimed in claim 5, further comprising a plurality of transmission antennas for transmitting the radio signal, and a plurality of reception antennas for receiving the radio signal.

8. An interference compensation method comprising the steps of:

performing reception-side MIMO (Multiple Input Multiple Output) processing to output a plurality of reception modulated signals respectively corresponding to a plurality of unique paths; and receiving, after performing the reception-side MIMO processing, corresponding one of reception modulated signals to cancel inter-path interference contained therein and caused as interference between the unique paths by difference in propagation delay according to antenna-to-antenna distances, wherein the interference compensation step comprises the steps of:

receiving the demodulated signal from a carrier regenerator provided in association with each of the plurality of reception modulated signals for demodulating an input modulated signal and outputting the demodulated signal;

detecting a deviation of the demodulated signal from an ideal signal point to generate an error signal representing the phase direction and amplitude of the deviation;

generating a compensation signal for cancelling the inter-path interference contained in a corresponding reception modulated signal with the use of the error signal; and adding the compensation signal to the corresponding reception modulated signal to output the addition result to the carrier regenerator as the input modulated signal.

9. The interference compensation method as claimed in claim 8, wherein the compensation signal generating step comprises the step of comparing the error signal with another reception modulated signal corresponding to the another unique path to generate a signal according to the phase, amplitude, and time of the inter-path interference contained in the corresponding reception modulated signal as the compensation signal.

10. The interference compensation method as claimed in claim 9, wherein the compensation signal generating step comprises the steps of:

computing a correlation between the another reception modulated signal and the error signal to generate a tap coefficient for cancelling the inter-path interference contained in the corresponding reception modulated signal; and generating the compensation signal for cancelling the inter-path interference contained in the corresponding reception modulated signal with the use of the tap coefficient by means of a transversal filter and outputting the compensation signal.

\* \* \* \* \*